United States Patent [19]

Minevski

[11] Patent Number: 5,556,451
[45] Date of Patent: Sep. 17, 1996

[54] OXYGEN INDUCED CORROSION INHIBITOR COMPOSITIONS

[75] Inventor: Ljiljana V. Minevski, The Woodlands, Tex.

[73] Assignee: Betz Laboratories, Inc., Trevose, Pa.

[21] Appl. No.: 504,635

[22] Filed: Jul. 20, 1995

[51] Int. Cl.⁶ .................................................. C23F 11/00
[52] U.S. Cl. ........................... 106/14.13; 106/14.24; 106/14.27; 106/14.28; 106/14.41; 106/14.42; 252/388; 252/390; 252/392; 252/394; 252/396; 422/7; 422/16; 422/17
[58] Field of Search ...................... 106/14.11, 14.13, 106/14.41, 14.42, 14.27, 14.28, 14.24; 252/388, 396, 390, 392, 394; 422/7, 16, 17

[56] References Cited

U.S. PATENT DOCUMENTS

| | | | |
|---|---|---|---|
| 3,717,433 | 2/1973 | Scherf et al. | 252/392 |
| 3,896,044 | 7/1975 | Mago et al. | 252/192 |
| 4,062,764 | 12/1977 | White et al. | 208/348 |
| 4,120,655 | 10/1978 | Crambes et al. | 252/389 |
| 4,241,015 | 12/1980 | Hirozawa et al. | 422/13 |
| 4,241,016 | 12/1980 | Hirozawa et al. | 422/13 |
| 4,246,030 | 1/1981 | Lipinski | 106/14.12 |
| 4,595,425 | 6/1986 | Harding | 252/392 |
| 4,927,669 | 5/1990 | Knox et al. | 427/239 |
| 4,929,364 | 5/1990 | Reardon et al. | 252/393 |
| 5,089,349 | 2/1992 | Kaiser | 428/472.1 |
| 5,091,108 | 2/1992 | Harder et al. | 252/392 |
| 5,292,480 | 3/1994 | Fischer et al. | 422/12 |

*Primary Examiner*—Anthony Green
*Attorney, Agent, or Firm*—Alexander D. Ricci; Matthew W. Smith

[57] ABSTRACT

Compositions and methods of using the compositions to inhibit oxygen induced corrosion of metal exposed to aqueous solutions are disclosed. The compositions include hydroxybenzoic acid in formulations with imidazoline, heavy aromatic naphtha, polymerized tall oil fatty acid, alkanols, dimer trimer acids, alkanoic acid, alkanediols, and water. The compositions, when added to aqueous solutions, effectively inhibit oxygen induced corrosion of metal.

8 Claims, 3 Drawing Sheets

OXYGEN INDUCED CORROSION INHIBITOR COMPOSITIONS

FIELD OF THE INVENTION

The present invention relates to the inhibition of oxygen induced corrosion of metals. More particularly, the present invention relates to hydroxybenzoic acid containing compositions and methods of using the same to inhibit oxygen induced corrosion.

BACKGROUND OF THE INVENTION

The presence of dissolved gases, even in small amounts, is undesirable in systems having aqueous solutions which contact metal surfaces. "Aqueous solutions" as used herein includes solutions in which water is the predominant component as well as solutions in which water is present as a minor component along with predominantly hydrocarbons. Such solutions include crude oil and water solutions produced from oil bearing subterranean formations. Metal surfaces in contact with oxygen-containing aqueous solutions can experience pitting. Pitting is highly concentrated corrosion affecting only a small area of the total metal surfaces. Pitting can be a serious problem causing metal failure even though only a small amount of metal is lost and the overall corrosion rate is relatively low.

The severity of attack by oxygen will depend on the concentration of dissolved oxygen in the aqueous solution, pH and temperature. As aqueous solution temperatures increase, as for example in a water heating system, enough driving force is added to the corrosion reaction that small amounts of dissolved oxygen in the aqueous solution can cause serious problems. Oxygen pitting is considered to be a very serious problem in systems such as pipelines, boilers and aqueous heat exchange systems such as boiler feedwater heaters, economizers and superheaters.

In some systems such as boiler systems, vacuum deaeration is an important first step in removing dissolved oxygen in water along with the addition of chemical corrosion inhibitors. In other systems such as pipelines, chemical corrosion inhibition is the typical means to inhibit oxygen induced corrosion.

Due to the variety of systems where oxygen induced corrosion is a problem, a continual need exists for new, effective, chemical corrosion inhibitors.

Thus it is an object of this invention to provide compositions and methods of using the compositions which are effective for inhibiting oxygen induced corrosion of metals exposed to aqueous solutions.

PRIOR ART

U.S. Pat. No. 4,927,669 to Knox et al. discloses corrosion inhibitor formulations including the product obtained by reacting maleic anhydride and fumaric acid with unsaturated fatty acids. The polymerized fatty acid is useful as a component in corrosion inhibition formulations.

U.S. Pat. No. 5,292,480 to Fischer et al. discloses a corrosion inhibitor produced by first reacting $C_{18}$ unsaturated fatty acids with maleic anhydride or fumaric acid to produce the fatty acid Diels-Alder adduct or the fatty acid-ene reaction product. The adduct or reaction product is further reacted in a condensation or hydrolyzation reaction with a polyalcohol to form an acid-anhydride ester corrosion inhibitor. The acid anhydride corrosion inhibitor may be used alone, or with other components in a corrosion inhibitor formulation.

SUMMARY OF THE INVENTION

To achieve the foregoing and other objects, the present invention provides compositions and a method of using the compositions to inhibit oxygen induced corrosion of metal exposed to aqueous solutions.

The method comprises incorporating into an aqueous solution a corrosion inhibitor composition which includes a hydroxybenzoic acid in an amount effective for the purpose of corrosion inhibition.

Preferred corrosion inhibitor compositions are comprised of hydroxybenzoic acid, imidazoline, heavy aromatic naphtha, optionally polymerized tall oil fatty acid, optionally a $C_2$–$C_6$ alcohol, optionally dimer trimer acids, optionally a $C_2$–$C_6$ alkanoic acid and optionally a $C_2$–$C_6$ alkandiol.

The most preferred hydroxybenzoic acids are salicylic and gallic acid.

DETAILED DESCRIPTION OF THE PREFERRED EMBODIMENTS

Figure 1:
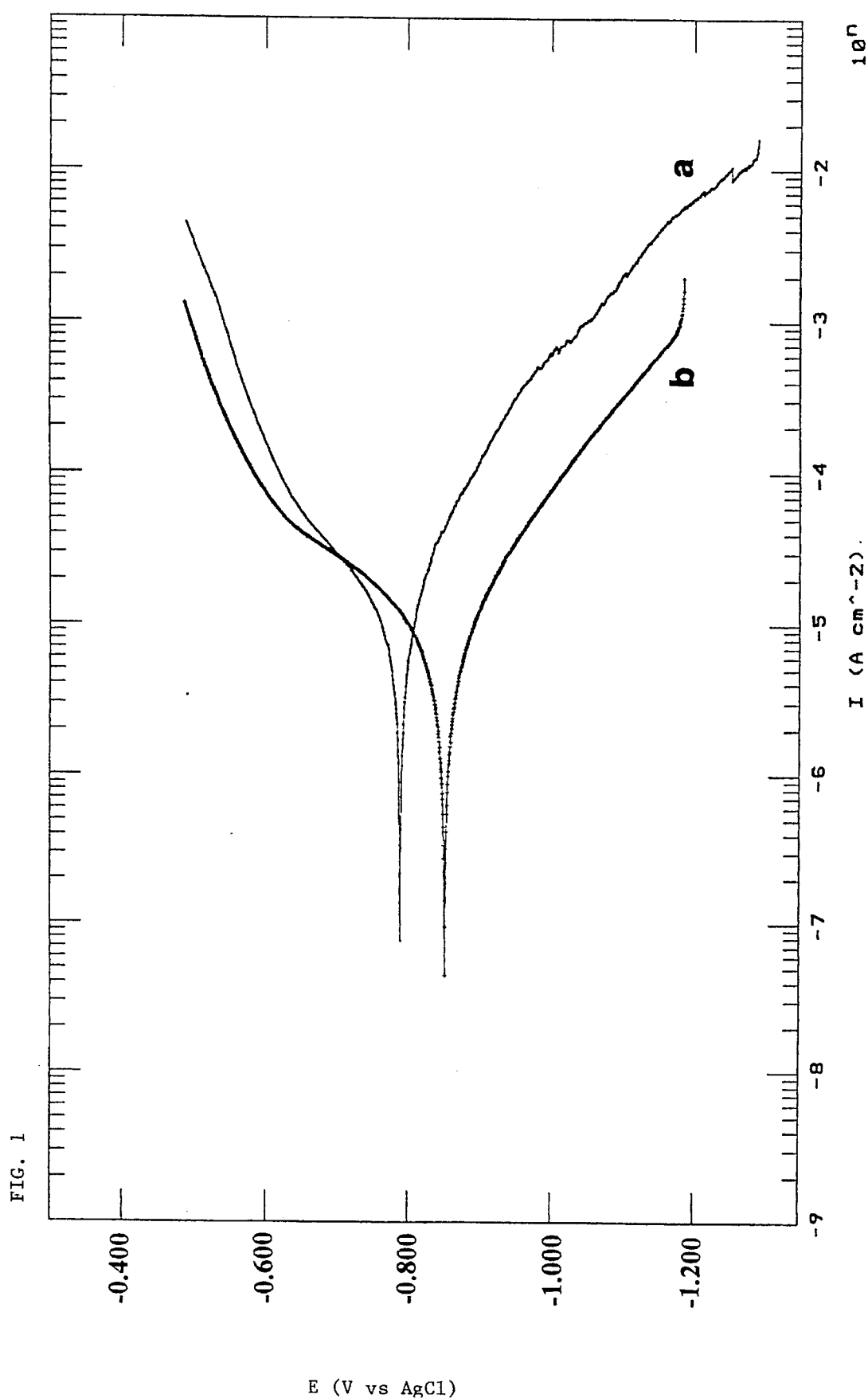
FIG. 1 is a plot of the polarization curves for an untreated disc (a) and a treated disc (b) in a brine:kerosene solution at 140 ppb oxygen concentration and a corrosion inhibitor treatment level of 25 ppm.

The inventor of the present invention has discovered that corrosion inhibitor compositions, which include hydroxybenzoic acid in the inhibitor formulation, effectively inhibit oxygen induced corrosion of metal exposed to an aqueous solution, when the compositions are added to said aqueous solution.

The hydroxybenzoic acid containing corrosion inhibitor composition can be either water or hydrocarbon based so long as the composition provides a protective film or coating on metal surfaces.

Preferred components from which corrosion inhibitors can be formulated with hydroxybenzoic acid are imidazoline, heavy aromatic naphtha, polymerized tall oil fatty acid, $C_2$–$C_6$ alkanols such as isopropyl alcohol, dimer trimer acids, $C_2$–$C_6$ alkanoic acids such as propionic acid, $C_2$–$C_6$ alkanediols such as ethylene and hexylene glycol, and water. Imidazoline is available commercially from Betz Laboratories, Inc. Polymerized tall oil fatty acid is available commercially from Westvaco as Tenax™ 2010. Dimer trimer acids are available commercially as Century® D-75 from Union Camp.

The preferred amounts of each of the corrosion inhibitor components are from about 1 weight percent to about 15 weight percent hydroxybenzoic acid, from about 10 to about 20 weight percent imidazoline, from about 20 to about 70 weight percent aromatic naphtha, up to about 20 weight percent polymerized tall oil fatty acid, up to about 40 weight percent $C_2$–$C_6$ alkanol, up to about 15 weight percent dimer trimer acid, up to about 10 weight percent $C_2$–$C_6$ alkanoic acid and up to about 10 weight percent $C_2$–$C_6$ alkanediol.

The preferred hydroxybenzoic acids are salicylic and gallic acid.

The amount of neat corrosion inhibitor composition added to a system to inhibit oxygen induced corrosion will vary depending on the type of system, the amount of dissolved oxygen in the system, the presence or absence of oxygen scavengers and other factors. However, it is expected that concentrations of from about 1 ppm to about 500 ppm of neat corrosion inhibitor in an aqueous solution will be effective to inhibit corrosion.

The following examples are provided to illustrate preferred embodiments of the invention and are not intended to restrict the scope thereof.

EXAMPLES

A three electrode system was used for evaluating corrosion rates in the absence and presence of corrosion inhibitor compositions. An aqueous solution having an aqueous:hydrocarbon phase ratio of 90:10 of brine:kerosene was used at 40° C. The brine phase consisted of 9.62 weight percent NaCl, 0.401 weight percent $CaCl_2.2H_2O$, 0.186 weight percent $MgCl_2.6H_2O$ and 89.793 weight percent water. The brine was purged with argon gas before the brine was introduced into an electrochemical cell. Kerosene was added on top of the purged brine and argon purging was continued. Discs of mild steel 1018 were used as working electrodes in the glass electrochemical cells. A blank was left unprotected without a corrosion inhibitor. To other cells were added various corrosion inhibitors at several concentrations. After the metal discs and brine/kerosene solution were added to an electrochemical cell, the solution was purged at different flow rates of argon and oxygen using Gilmont® flow meters and Gilmont® analysis software from which the parts per billion (ppb) concentration of oxygen in the solution was determined using Henry's law. Dissolved oxygen was also measured colorimetrically after the test conclusion using CHEMets® dissolved oxygen determination based on Rhodazine D dye.

The extent of corrosion was based on the calculated corrosion rates using Stern-Geary Equation/EG&G Corrosion Software.

The percent protection was calculated using the equation:

$$\% P = [(C.R., b - C.R., i)/C.R., b] \times 100$$

where C.R., b is the corrosion rate for the blank oxygenated system and C.R., i is the corrosion rate for a treated oxygenated system.

The corrosion inhibitor formulations tested are shown in Tables I and II.

TABLE I

| Composition | Weight Percent Composition | | | |
|---|---|---|---|---|
| | GA 1 | GA 2 | GA 3 | GA 4 |
| Gallic acid | 5% | 4% | 4% | 4% |
| Isopropanol | — | 30% | 30% | 30% |
| Heavy aromatic naphtha | — | 33% | 33% | 33% |
| Imidazoline | — | 17% | 17% | 17% |
| Polymerized tall oil fatty acid | — | — | 10% | — |
| Dimer trimer acid | — | 10% | — | 10% |

TABLE I-continued

| Composition | Weight Percent Composition | | | |
|---|---|---|---|---|
| | GA 1 | GA 2 | GA 3 | GA 4 |
| Propionic acid | — | 6% | 6% | — |
| Hexylene glycol | — | — | — | 6% |
| Ethylene glycol | 35% | — | — | — |
| Water | 60% | — | — | — |

TABLE II

| Composition | Weight Percent Composition | | | |
|---|---|---|---|---|
| | SA 1 | SA 2 | SA 3 | SA 4 |
| Salicylic acid | 4% | 6% | 10% | 4% |
| Heavy aromatic naphtha | 63% | 64% | 60% | 33% |
| Imidazoline | 17% | 16% | 15% | 17% |
| Polymerized tall oil fatty acid | 10% | 14% | 15% | 10% |
| Isopropanol | — | — | — | 30% |
| Propionic acid | 6% | — | — | 6% |

Example I

Mild steel discs in the brine/kerosene solution described above were treated with 25 ppm of GA3 and subjected to varying amounts of dissolved oxygen. The percent protection provided to the metal discs is shown in Table III.

TABLE III

| $O_2$ Concentration (ppb) | Percent Protection | | |
|---|---|---|---|
| | after 16 hours | after 40 hours | after 60 hours |
| 35 | 94 | — | 99 |
| 75 | 88 | 90 | — |
| 140 | 82 | — | — |
| 270 | 95 | — | — |
| 600 | 75 | — | — |

Example II

Mild steel discs in the brine/kerosene solution described above were treated with varying amounts of corrosion inhibiting composition at varying oxygen concentrations. The percent protection after 16 hours is shown in Table IV.

TABLE IV

| $O_2$ Concentration (ppb) | Treatment Level | | | | |
|---|---|---|---|---|---|
| | GA 1 100 ppm | GA 2 50 ppm | GA 2 100 ppm | GA 3 25 ppm | GA 3 100 ppm | GA 4 200 ppm |
| 35 | — | 92 | 97 | 94 | 99.5 | 99 |
| 75 | — | — | — | 88 | 95.0 | — |
| 140 | 87 | — | — | 82 | 99.8 | — |
| 270 | 99.8 | — | — | 95 | 99.9 | — |
| 600 | — | — | — | 75 | 91 | — |

Figure 2:
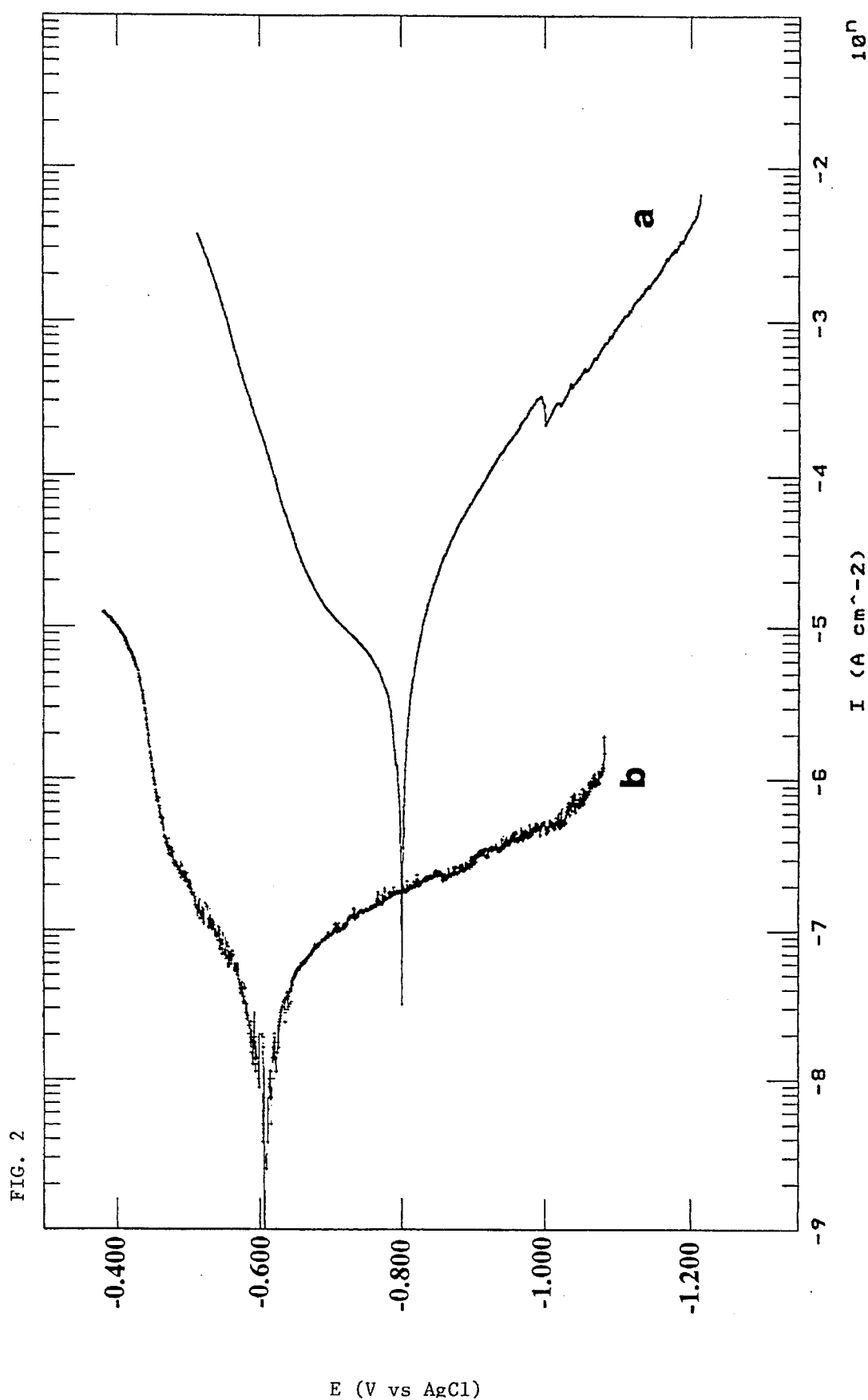
FIG. 2 is a plot of the polarization curves for an untreated disc (a) and a treated disc (b) in a brine:kerosene solution at 140 ppb oxygen concentration and a corrosion inhibitor treatment level of 100 ppm.

It is important to note that protection against corrosion increases with time as shown in Table III and with higher treatment levels as shown in Table IV. This is shown graphically in FIGS. 1, 2 and 3. Curves (a) in FIGS. 1 and 2 is the polarization curve for the oxygenated system which shows oxygen activity at approximately 200 mV versus open circuit potential with 140 ppb of oxygen in the solution. Curves (b) in FIGS. 1 and 2 are the polarization curves for solutions treated with 25 ppm and 100 ppm of GA 3 respectively. FIGS. 1 and 2 show that improved corrosion protection, as indicated by a more positive shifted open circuit potential, is obtained with increasing concentrations of GA 3 in the electrochemical cell.

Figure 3:
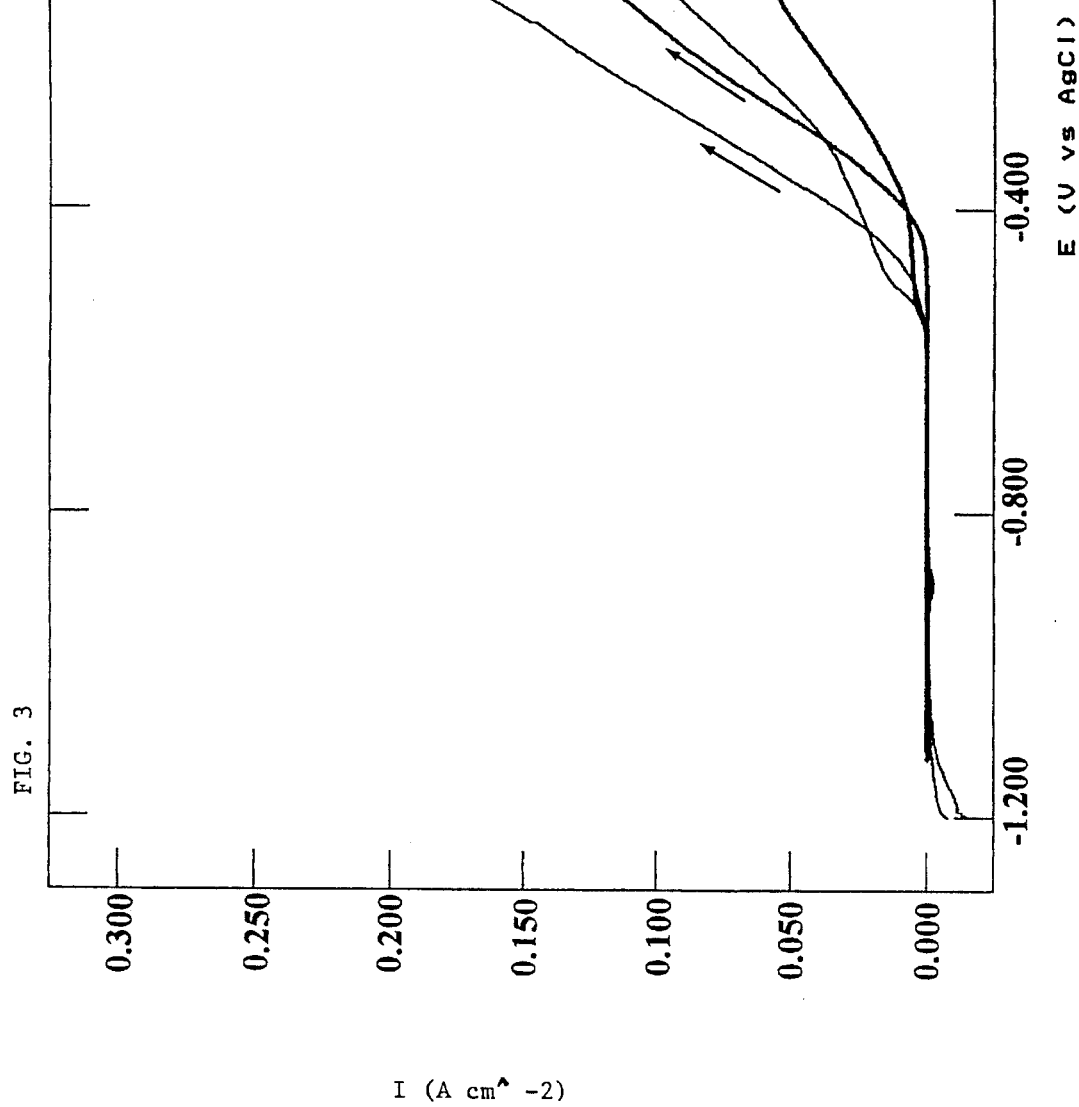
FIG. 3 is a plot of the polarization curve, for an untreated disc (a) and a treated disc (b) in a brine:kerosene solution at 75 ppb oxygen concentration and a corrosion inhibitor treatment level of 25 ppm.

At low treatment levels and lower oxygen concentration pitting potential takes place at less positive potential as shown in FIG. 3. FIG. 3 shows untreated (a) and treated (b) system cyclic polarization curves for systems containing 75 ppb oxygen. Curve (b) is the cyclic polarization curve for a solution containing 25 ppm of GA 3. In FIG. 3, the untreated oxygenated system, curve (a), continued to pit during the reverse scan while the treated oxygenated system, curve(b), immediately exhibited lower current densities upon scan reversal (i.e., point X on FIG. 3). Curve (b) indicates that the treatment composition inhibits corrosion. The untreated system shown by curve (a) increased current densities shortly after scan reversal (i.e., point y on FIG. 3) indicating that the untreated system continued to corrode.

Example III

Mild steel discs were treated with varying amounts of corrosion inhibiting compositions at varying oxygen concentrations. The brine/kerosene temperature was maintained at 38° C. The percent protection results after 18 hours are shown in Table V.

TABLE V

| $O_2$ Concentration (ppb) | Treatment Level | | | | |
|---|---|---|---|---|---|
| | SA 1 | SA 2 | SA 3 | | SA 4 |
| | 50 ppm | 50 ppm | 25 ppm | 50 ppm | 100 ppm |
| 40 | 92 | 99.5 | 99.7 | 99.8 | 98 |
| 80 | — | — | — | — | 98 |
| 140 | — | — | — | — | 99.5 |
| 270 | 59 | 87* | 98 | 99 | — |

*Discs treated with 50 ppm of SA2 exhibited from 92% to 98% protection in the period from 20 hours to 50 hours of running respectively after exposure to 270 ppb of oxygen.

Comparative

A polymerized tall oil fatty acid available commercially from Westvaco as Tenax™ 2010 was dissolved in heavy aromatic naphtha to 12 weight percent actives. 50 ppm of the polymerized tall oil fatty acid in naphtha was used as a treatment in the above described brine/kerosene solution. The solution was oxygenated to a concentration of 40 ppb. After 16 hours of exposure the polymerized tall oil fatty acid in naphtha provided 67% corrosion protection to the mild steel disc.

Examples I to III demonstrate that corrosion inhibiting compositions including hydroxybenzoic acid provide metals effective protection from oxygen induced corrosion.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:
1. A method of inhibiting oxygen induced corrosion of metal in contact with an aqueous solution, said method comprising adding to said aqueous solution a corrosion inhibitor comprising
   a) hydroxybenzoic acid;
   b) heavy aromatic naphtha;
   c) imidazoline; and
   d) at least one selected from the group consisting of a $C_2$–$C_6$ alcohol, a dimer trimer acid, a $C_2$–$C_6$ alkanoic acid; a $C_2$–$C_6$ alkanediol; and polymerized tall oil fatty acid;
in an amount effective for the purpose of oxygen induced corrosion inhibition.
2. The method of claim 1 wherein said hydroxybenzoic acid is salicylic acid or gallic acid.
3. The method of claim 1 wherein said amount effective for the purpose of corrosion inhibition is an amount sufficient to establish from about 1 ppm to about 500 ppm of said corrosion inhibitor in said aqueous solution.
4. A method of inhibiting oxygen induced corrosion of metal in contact with an aqueous solution, said method comprising adding to said aqueous solution an amount effective for the purpose of corrosion inhibition of a corrosion inhibitor comprising:
   from about 1 weight percent to about 15 weight percent hydroxybenzoic acid; from about 10 weight percent to about 20 weight percent imidazoline; from about 20 weight percent to about 70 weight percent heavy aromatic naphtha; up to about 20 weight percent polymerized tall oil fatty acid; up to about 40 weight percent $C_2$–$C_6$ alkanol; up to about 15 weight percent dimer trimer acid; up to about 10 weight percent $C_2$–$C_6$ alkanoic acid; and up to about 10 weight percent $C_2$–$C_6$ alkanediol.
5. A composition effective for inhibiting oxygen induced corrosion of metals in contact with an aqueous solution, said composition comprising hydroxybenzoic acid, imidazoline, heavy aromatic naphtha, and at least one selected from the group consisting of a polymerized tall oil fatty acid, an alkanol having from two to six carbon atoms, a dimer trimer acid, an alkanoic acid having two to six carbon atoms and an alkanediol having from two to six carbon atoms.
6. The composition of claim 5 wherein said hydroxybenzoic acid is salicylic acid or gallic acid.
7. A composition effective for inhibiting oxygen induced corrosion of metals in contact with an aqueous solution, said composition comprising:
   a) from about 1 weight percent to about 15 weight percent hydroxybenzoic acid;
   b) from about 10 weight percent to about 20 weight percent imidazoline;
   c) from about 20 to about 70 weight percent heavy aromatic naphtha;
   d) up to about 40 weight percent $C_2$–$C_6$ alkanol;
   e) up to about 15 weight percent dimer trimer acid;
   f) up to about 10 weight percent $C_2$–$C_6$ alkanoic acid;
   g) up to about 10 weight percent $C_2$–$C_6$ alkanediol; and
   h) up to about 20 weight percent polymerized tall oil fatty acid.
8. The composition of claim 7 wherein said hydroxybenzoic acid is gallic acid or salicylic acid.

* * * * *